United States Patent [19]
Keijzer et al.

[11] 3,722,639
[45] Mar. 27, 1973

[54] SHOCK ABSORBER INCLUDING NOISE REDUCING MEANS

[75] Inventors: Johan H. Keijzer, Hasselt; Francois J. G. Meuleman, Bettincourt, Waremme; Louis J. Jossa; Jozef J. Stas, both of St. Truiden, all of Belgium

[73] Assignee: Monroe Belgium N.V., Truiden, Belgium

[22] Filed: Mar. 3, 1971

[21] Appl. No.: 120,558

[52] U.S. Cl. .................................................. 188/315
[51] Int. Cl. ............................................... F16f 9/32
[58] Field of Search ..................... 188/269, 315, 322

[56] References Cited

UNITED STATES PATENTS

| 2,469,276 | 5/1949 | Rossman | 188/315 |
| 2,714,942 | 8/1955 | Funkhouser | 188/315 |

FOREIGN PATENTS OR APPLICATIONS

| 629,564 | 10/1961 | Canada | 188/315 |
| 1,146,312 | 3/1963 | Germany | 188/315 |
| 663,372 | 12/1951 | Great Britain | 188/269 |

Primary Examiner—George E. A. Halvosa
Attorney—Harness, Dickey & Pierce

[57] ABSTRACT

A generally ring-shaped member adapted to be installed within the fluid reservoir of a hydraulic direct-acting telescopic shock absorber for damping mechanical vibrations and/or controlling the flow of hydraulic fluid during operation of the shock absorber and thereby reducing the noise produced during operation of the shock absorber.

2 Claims, 8 Drawing Figures

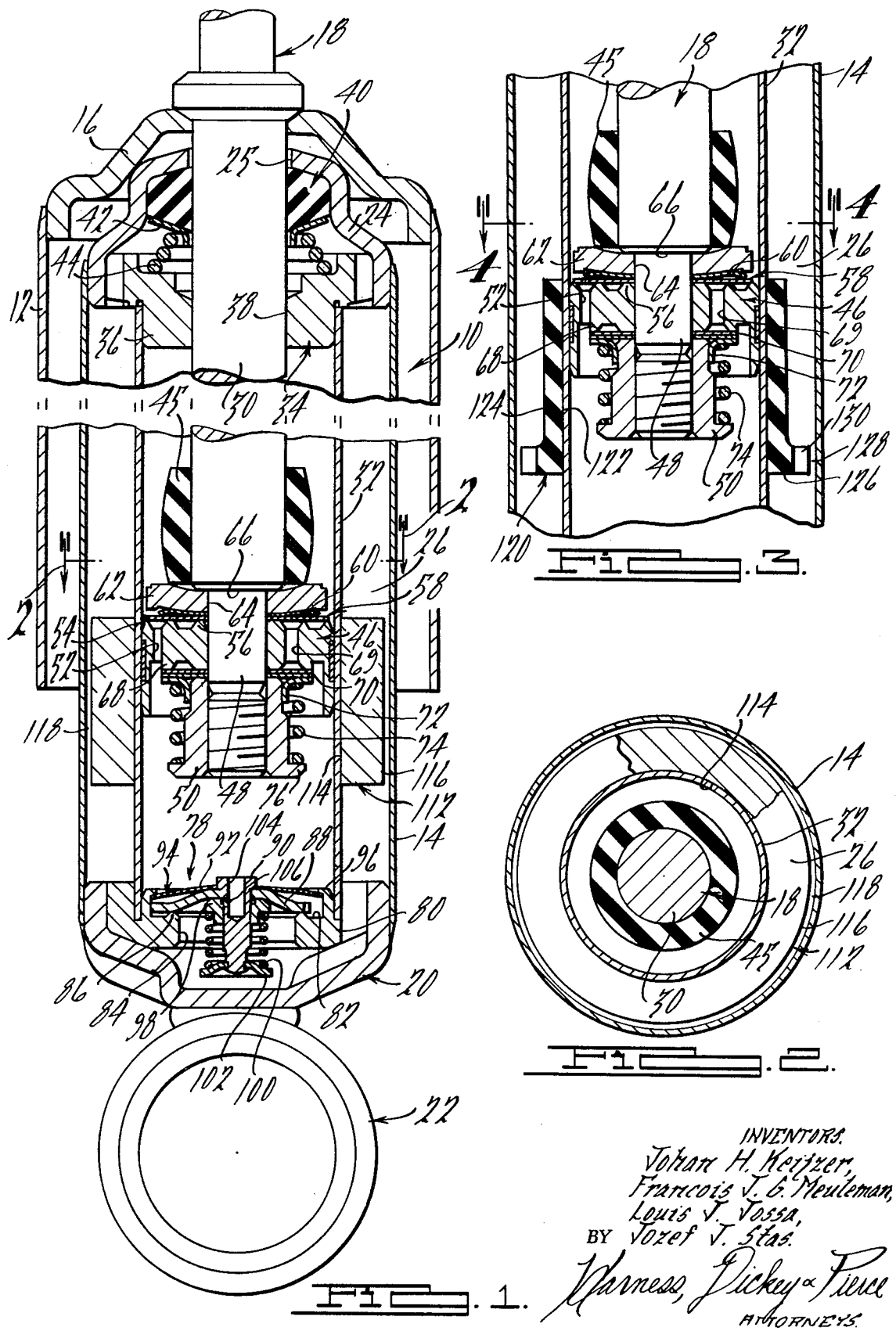

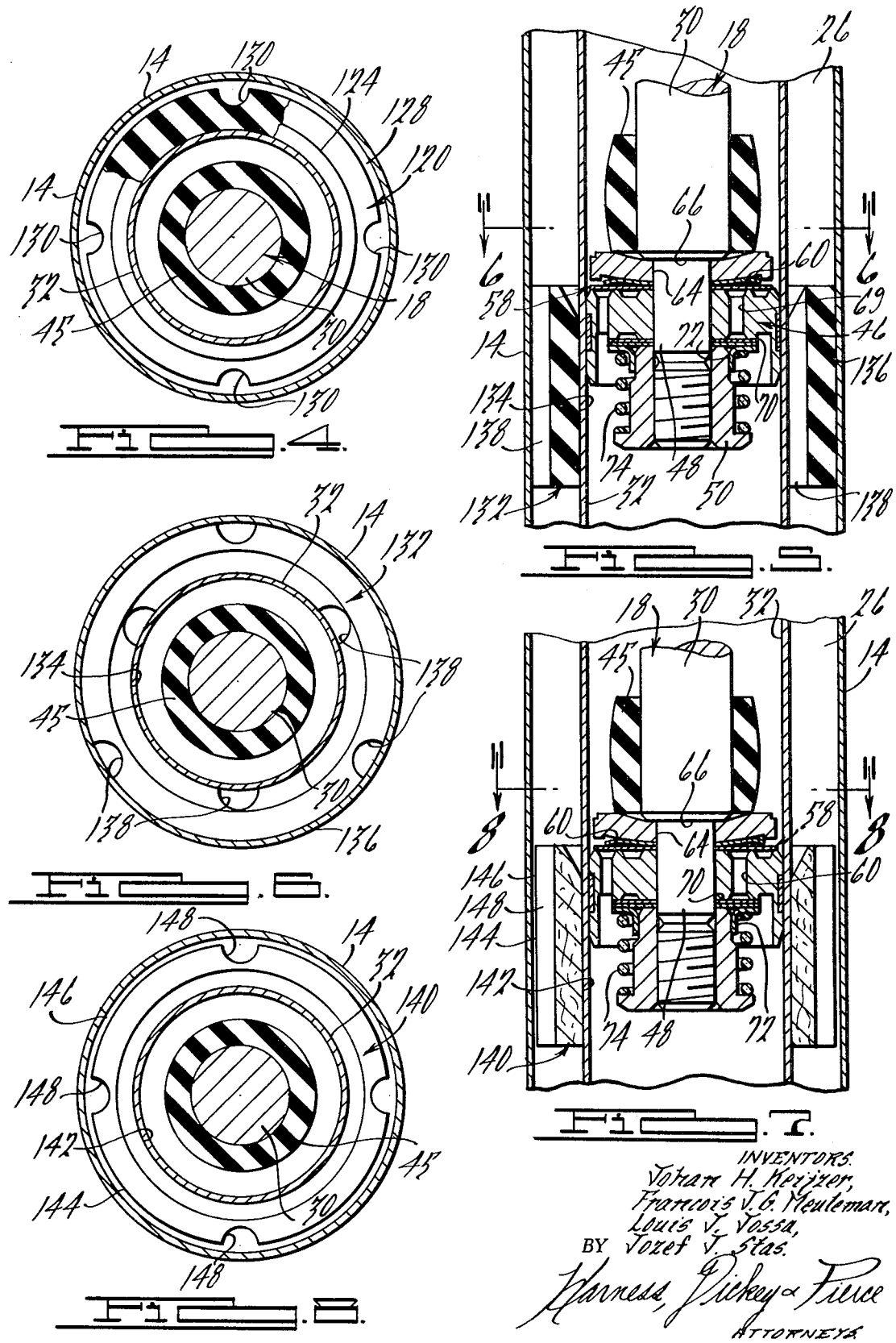

SHOCK ABSORBER INCLUDING NOISE REDUCING MEANS

SUMMARY OF THE INVENTION

The present invention relates generally to hydraulic shock absorbers, and more specifically to a new and improved shock absorber assembly having a novel means for reducing the noise produced during operation thereof. The aforesaid means generally comprises an annular or generally ring-shaped member which is disposed within the fluid reservoir circumjacent the pressure cylinder, the member being dimensioned and of a suitable configuration so as to define fluid flow passages within the fluid reservoir. The noise reducing member may be fabricated of a variety of different materials and may be of different sizes and configurations commensurate with the size of the associated shock absorber assembly and with the particular manner in which fluid flow control is desired, whereby to provide for universality of application.

It is accordingly a general object of the present invention to provide a new and improved shock absorber assembly.

It is a more particular object of the present invention to provide a shock absorber assembly having improved noise producing characteristics.

It is yet a more particular object of the present invention to provide a direct-acting telescopic hydraulic shock absorber which is provided with a generally ring-shaped noise reducing member in the fluid reservoir thereof, which member may be fabricated of a variety of different types of materials and be economically fabricated so as to enhance the operational characteristics of the associated shock absorber without appreciably changing the cost of manufacture thereof.

Other objects and advantages of the present invention will become apparent from the following detailed description taken in conjunction with the accompanying drawings.

BRIEF DESCRIPTION OF THE DRAWINGS

FIG. 1 is a longitudinal cross-sectional view of a shock absorber assembly embodying the principles of the present invention;

FIG. 2 is a transverse cross-sectional view taken substantially along the line 2—2 of FIG. 1;

FIG. 3 is a fragmentary longitudinal cross-sectional view of a shock absorber assembly in accordance with an alternate embodiment of the present invention;

FIG. 4 is a transverse cross-sectional view taken substantially along the line 4—4 of FIG. 3;

FIG. 5 is a fragmentary longitudinal cross-sectional view, similar to FIG. 3; and illustrates another embodiment of the present invention;

FIG. 6 is a transverse cross-sectional view taken substantially along the line 6—6 of FIG. 5;

FIG. 7 is a fragmentary longitudinal cross-sectional view, similar to FIGS. 3 and 5, and illustrates yet another embodiment of the present invention, and FIG. 8 is a transverse cross-sectional view taken substantially along the line 8—8 of FIG. 7.

DETAILED DESCRIPTION OF PREFERRED EMBODIMENTS

Referring now in detail to the drawings, and in particular to FIG. 1, a shock absorber assembly 10, in accordance with an exemplary embodiment of the present invention, is shown as comprising upper and lower, generally tubular-shaped, concentrically and telescopically oriented members 12 and 14. As is conventional, the members 12, 14 are longitudinally movable relative to one another and are adapted for operative attachment to the sprung and unsprung portions of an associated vehicle or the like. The upper end of the member 12 is provided with a generally cup-shaped end cap member 16 which is fixedly secured to the member 12 and is also attached to a central, axially upwardly extending piston rod 18 adapted to be secured by any suitable means to one of the aforementioned associated vehicle portions. The lower end of the member 14 is provided with a similar type, generally cup-shaped end cap member 20 which is fixedly secured to the member 14 and is provided with a ring-like attachment member 22 adapted to be secured to the other of the aforesaid associated vehicle portions. The opposite (upper) end of the tubular member 14 is also provided with a cup-shaped end cap member 24 which is formed with a central aperture 25 and with the member 14 defines an annular fluid reservoir 26. As shown in FIG. 1, a generally cylindrically shaped intermediate section 30 of the piston rod 18 extends through the aperture 25 and is reciprocable therethrough, as will later be described.

Disposed concentrically within the reservoir 26 is a longitudinally extending pressure cylinder 32, the upper end of which is provided with a piston rod guide member 34 having a downwardly extending, reduced diameter portion 36 adapted to be received within the upper end of the cylinder 32. The guide member 34 defines a central annular bore 38 through which the section 30 of the piston rod 18 extends. A rubber or other suitable sealing element 40 surrounds the piston rod section 30 and is confined within the interior of the cap member 24 by a suitable retaining element 42 and compression spring 44. A resilient annular bumper element 45 fabricated, for example, of rubber or the like, is carried on the section 30 of the piston rod 18 and adapted for engagement with the underside of the rod guide member 34 during the rebound cycle of the assembly 10, as is well known in the art.

A piston member, generally designated 46, is mounted on a lower, reduced diameter end portion 48 of the piston rod 18 and is adapted to be secured thereon by a suitable threadably mounted retaining nut 50. The piston member 46 is provided with a plurality of circumferentially spaced, radially outermost oriented set of longitudinally extending apertures 52 which are located between a pair of radially spaced, concentric valve seats 54 and 56 provided on the upper end of the member 46. The valve seats 54, 56 are cooperable with and adapted to be engaged by a relatively thin, washer-like valve member 58 which functions to close the upper ends of the apertures 52 when the piston rod 18 is moved upwardly within the pressure cylinder 32. A spring disk 60 is disposed directly above the valve member 58 and is adapted to resiliently urge the latter toward the valve seats 54, 56. A retaining member 62 is disposed directly above the spring disk 60 and is formed with a central aperture 64 through which the piston rod section 48 extends, the member 62 being fixed adjacent a radially extending shoulder 66 formed at the juncture of the piston rod sections 30 and 48, as illustrated.

An annular valve seat 68 is provided on the lower side of the piston member 46 and positioned radially outwardly from a plurality of circumferentially spaced, longitudinally extending inner set of apertures 69, the valve seat 68 being adapted for engagement with a thin washer-like valve 70 which is urged toward the valve seat 68 by means of annular sleeve member 72 which is slidable downwardly along the outer periphery of the nut 50 and is adapted to be urged upwardly by a helical coil spring 74. As illustrated, the upper end of the spring 74 bears against the sleeve member 72, while the lower end thereof bears against a radially outwardly extending flange portion 76 formed on the lower end of the nut 50. It will be seen that when the piston 46 is moved upwardly within the pressure cylinder 32, fluid under pressure will move downwardly through the apertures 69, thereby unseating the valve 70 and permitting fluid to pass into the area below the piston 46.

The lower end of the pressure cylinder 32 is provided with a compression valve assembly 78 which consists of a head 80 having a portion extending into the end of the cylinder 32 in secured sealed relation thereto. The head 80 is formed with an annular recess 82 on the upper side thereof which defines with a central axially extending aperture 84 and an upwardly extending valve seat 86. A washer-like valve member 88 rests upon the valve seat 86 and is secured to a central valve element 90 that is urged downwardly by spring fingers 92 of a disk 94 which is secured in position by a coined edge 96 on the upper side of the head 80. The element 90 is provided with a slidable sleeve 98 which is urged upwardly by a coil spring 100 against the underside of the valve member 88. The lower end of the spring 100 is supported by a suitable annular retaining member 102, as illustrated. The element 90 is formed with a central passageway 104 communicating with an outlet slot 106 which is in turn communicable with the lower side of the valve assembly upon downward movement of the sleeve 98 against the resistance of the spring 100, to permit the fluid to pass between the lower end of the cylinder 32 and the reservoir 26.

In accordance with the principles of the present invention, the shock absorber assembly 10 is provided with a new and improved means for reducing the noise produced upon reciprocable movement of the piston 46 within the pressure cylinder 32 and upon the flow of hydraulic fluid to and from the reservoir 26. As illustrated in FIGS. 1 and 2, such means comprises an annular or generally ring-shaped member 112 which is of a generally uniform cross section and defines concentric inner and outer cylindrical surfaces 114 and 116, respectively. The member 112 is adapted to be operatively disposed within the fluid reservoir 26 at a position interjacent the end caps 20 and 24, and in the embodiment illustrated in FIGS. 1 and 2, the diameter of the inner surface 114 is approximately equal to the outer diameter of the pressure cylinder 32, whereas the diameter of the outer surface 116 is slightly smaller than the inner diameter of the cylindrical member 14, whereby an annular axially extending fluid flow passage 118 is defined between the exterior of the member 112 and the interior of the member 114.

FIGS. 3 and 4 illustrate a slightly modified embodiment of the present invention wherein a noise reducing member 120 is shown as being of a generally ring-shaped or tubular configuration and having radially spaced inner and outer concentric cylindrical surfaces 122 and 124, respectively. As shown, the diameter of the inner surface 122 is approximately equal to the outer diameter of the pressure cylinder 32, whereas the diameter of the outer surface 124 is such that the surface 124 is spaced radially inwardly a substantial distance from the inner periphery of the cylindrical member 14. The lower end of the member 120 is formed with a radially outwardly projecting shoulder 126 which is spaced slightly radially inwardly from the inner diameter of the cylindrical member 14 and defines a fluid flow passage 128 therewith. The shoulder 126 is formed with a plurality of circumferentially spaced axially extending grooves or recessed areas 130 which cooperate with the passage 128 in permitting axial fluid flow between the outer periphery of the member 120 and the inner periphery of the cylindrical member 14.

FIGS. 5 and 6 illustrate yet another embodiment of the present invention wherein a generally ring-shaped or annular noise reducing member 132 is shown operatively disposed between the outer periphery of the pressure cylinder 32 and the inner periphery of the cylindrical member 14. The member 132 is similar in construction to the aforedescribed members 112 and 120, with the exception that the inner cylindrical surface thereof, herein designated 134, is adapted for peripheral engagement with the outer periphery of the pressure cylinder 32, and the outer cylindrical surface thereof, herein designated 136, is adapted for peripheral engagement with the inner periphery of the cylindrical member 14. Additionally, the inner and outer surfaces 134, 136 are formed with circumferentially staggard axially extending and radially disposed grooves or recessed areas 138 which provide for fluid flow between the upper and lower ends of the reservoir 26 at both the radially inner and outer sides of the member 132.

FIGS. 7 and 8 depict still another embodiment of the present invention wherein a noise reducing member 140, similar to the members 132, 120 and 112, is provided interjacent the outer periphery of the pressure cylinder 32 and the inner periphery of the cylindrical member 14. The noise reducing member 140 is similar in construction to the member 112 in that the inner cylindrical surface 142 thereof is adapted for peripheral engagement with the outer surface of the pressure cylinder 32, and that the outer cylindrical surface thereof, herein designated 144, is spaced slightly radially inwardly from the inner periphery of the cylindrical member 114, whereby to define an axially extending annular fluid flow passage 146 therewith. The member 140 differs from the aforedescribed member 112 in that a plurality of circumferentially spaced, axially extending grooves or recessed areas 148 are provided around the outer periphery of the member 140 and thereby coact with the fluid flow passage 146 in providing fluid flow between the upper and lower ends of the reservoir 26.

The members 112, 120, 132 and 140 may be fabricated of any suitable material which is impervious to the hydraulic fluid utilized in the shock absorber assembly 10 and substantially one fourth the axial length of the reservoir. For example, the aforesaid members may be fabricated of a polymeric plastic material, as is illustrated in FIGS. 1 and 2, or alternatively, may be fabricated of a resiliently elastomeric material, such as molded rubber or the like, as is illustrated in FIGS. 3 through 6. As a further alternative, the aforesaid sound reducing members may be fabricated of any suitable molded fibrous material, such as is illustrated in FIGS. 7 and 8. Of course, various alternative constructions of the members 112, 120, 132 and 140 will come within the purview of the present invention.

While it is not entirely understood exactly how the aforesaid members 112, 120, 132 and 140 function to reduce the operational noise of the shock absorber 10 caused upon reciprocation of the piston 46 and piston rod 18 within the pressure cylinder 32, it is contemplated at the present time that the aforesaid sound reducing members possibly function to dampen the mechanical vibrations of the pressure cylinder 32 and member 14 during reciprocation of the piston 46 and piston rod 18. As a possible alternative, however, it is conceivable that the aforesaid sound reducing members control the flow of hydraulic fluid within the reservoir 26 so as to prevent or at least minimize aeration or foaming thereof, whereby to reduce the operational noise of the assembly 10. In the case of either of the aforesaid phenomena, or some other theory not presently known, the members 112, 120, 132 and 140 have been found to be highly effective in reducing the operational noise of the assembly 10 over comparable devices known in the prior art.

While it will be apparent that the preferred embodiments illustrated herein are well calculated to fulfill the objects above stated, it will be appreciated that the present invention is susceptible to modification, variation and change without departing from the scope of the invention.

We claim:

1. A shock absorber assembly comprising,
an elongated pressure cylinder defining a first cylindrical surface,
a piston reciprocally disposed within said cylinder and connected to one end of a piston rod projecting axially outwardly from said cylinder,
a cylindrical reserve tube extending concentrically around said pressure cylinder and defining a second cylindrical surface and an elongated cylindrical reservoir of predetermined radial dimension therewith,
said reservoir being partially filled with a quantity of hydraulic damping fluid and partially with a quantity of gas,
a base valve in the lower end of said pressure cylinder for selectively communicating damping fluid between said cylinder and said reservoir upon reciprocation of said piston, and
a noise reducing member disposed within said reservoir at a position spaced away from the axially opposite ends thereof and fixedly secured against relative axial movement therewithin, said member being of a substantially solid, non-deformable construction and said member being in the form of a hollow right circular cylinder substantially one forth the axial length of the reservoir and having inner and outer cylindrical faces, one of said faces contiguously engaged with one of said surfaces and one of said faces defining a restricted flow path with one of said surfaces.

2. A shock absorber assembly comprising,
an elongated pressure cylinder,
a piston reciprocally disposed within said cylinder and connected to one end of a piston rod projecting axially outwardly from said cylinder,
a cylindrical reserve tube extending concentrically around said pressure cylinder and defining an elongated cylindrical reservoir of predetermined radial dimension therewith,
said reservoir being partially filled with a quantity of hydraulic damping fluid and partially with a quantity of gas,
a base valve in the lower end of said pressure cylinder for selectively communicating damping fluid between said cylinder and said reservoir upon reciprocation of said piston, and
a hollow cylindrical noise reducing member disposed within said reservoir at a position spaced away from the axially opposite ends thereof and fixedly secured against relative axial movement therewithin, said member having a radial thickness predeterminately less than said radial dimension of said reservoir so as to define a restricted fluid flow path with the inner periphery of said reservoir, whereby fluid may flow axially within said reservoir through said flow path between positions above and below said member,
said member having the inner periphery thereof contiguously engaged with the outer periphery of said pressure cylinder and the outer periphery thereof contiguously engaged with the inner periphery of said reserve tube, with the inner and outer peripheries of said member being formed with a plurality of circumferentially staggered recesses extending the entire length of said member and defining said flow path.

* * * * *